Sept. 9, 1924.
J. C. TAYLOR
TESTING AND TRUING DEVICE
Filed Dec. 4, 1922
1,507,633
2 Sheets-Sheet 2
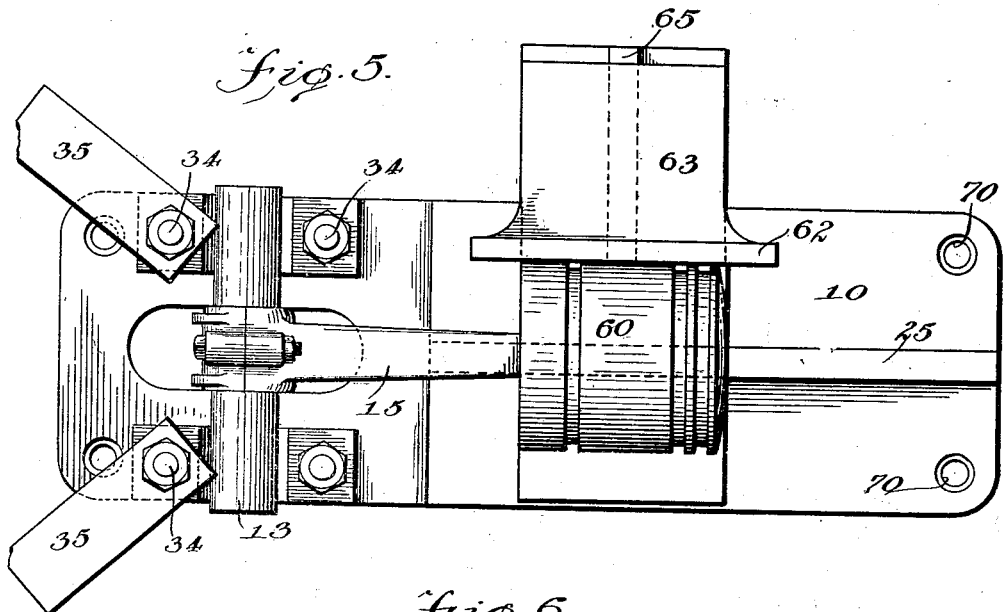
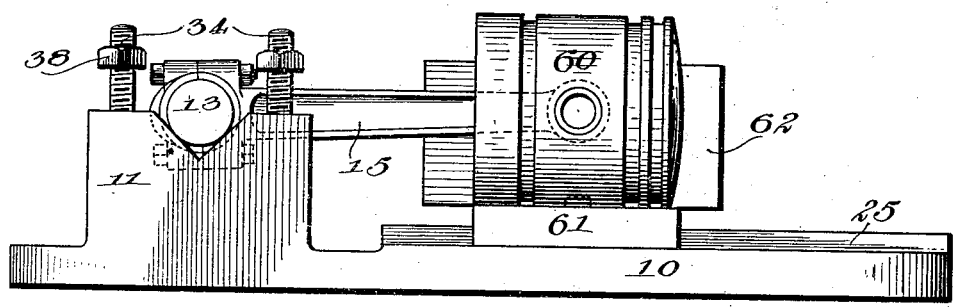
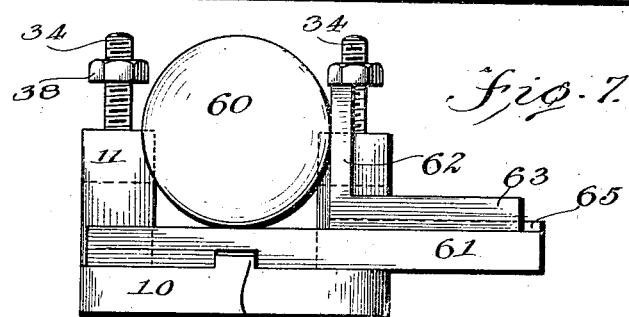
WITNESSES
INVENTOR
J. C. Taylor,
BY
ATTORNEYS Patented Sept. 9, 1924.

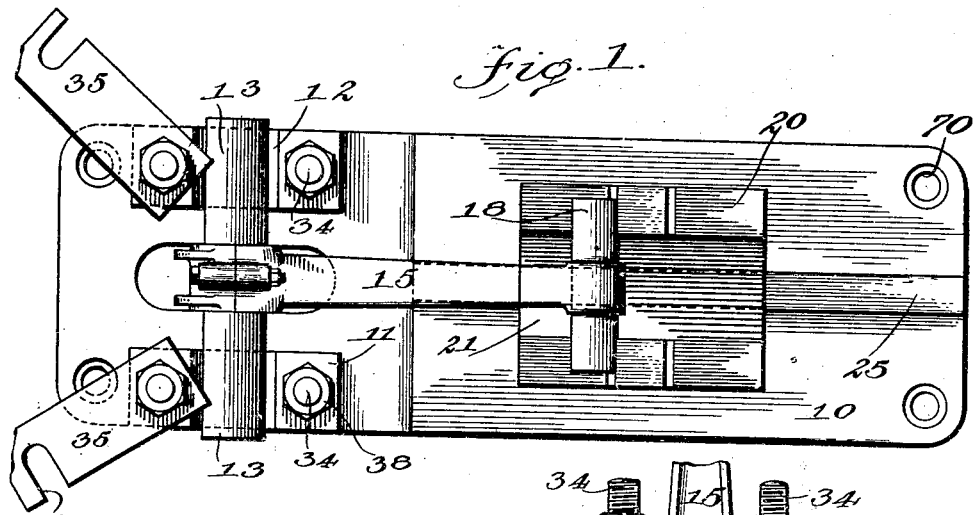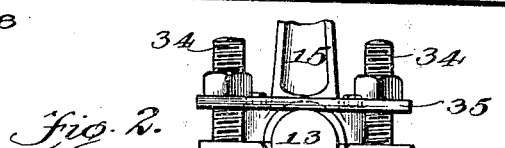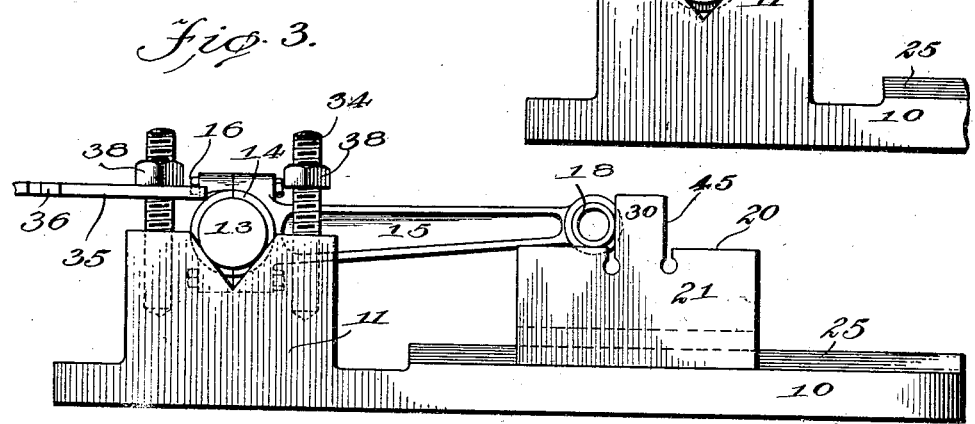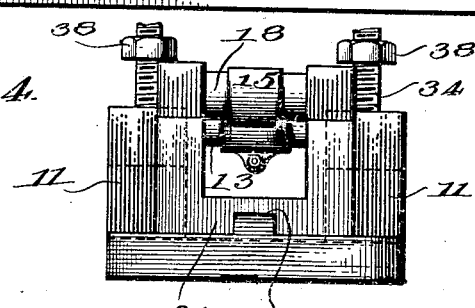

1,507,633

UNITED STATES PATENT OFFICE.

JOHN C. TAYLOR, OF HERMANSVILLE, MICHIGAN.

TESTING AND TRUING DEVICE.

Application filed December 4, 1922. Serial No. 604,840.

*To all whom it may concern:*

Be it known that I, JOHN C. TAYLOR, a citizen of the United States, and resident of Hermansville, in the county of Menominee and State of Michigan, have invented certain new and useful Improvements in Testing and Truing Devices, of which the following is a specification.

This invention relates to testing and straightening devices for the piston rods and pistons of engines.

Briefly stated an important object of this invention is to provide a testing and straightening device having simple and reliable means whereby the connecting rod of an engine may be tested to ascertain if the rod is bent or twisted and the approximate extent of the bend or twist.

A further object is to provide a device of the character specified having simple means whereby the lower or rear portion of the connecting rod is held in position so that the rod may be manually straightened.

A further object is to provide a testing apparatus of the character specified having a carriage movable longitudinally of the base and provided with a slidably supported contact block adapted to be engaged by one side of a piston to indicate if the piston is properly connected to the rod.

A further object is to provide a combined connecting rod testing and straightening device which consists of a minimum number of parts, which is of highly simplified construction and cheap to manufacture.

Other objects and advantages of the invention will be apparent during the course of the following description.

In the accompanying drawings forming a part of this application and in which like numerals are employed to designate like parts throughout the same, Figure 1 is a plan view of the improved testing and straightening apparatus.

Figure 2 is a fragmentary side elevation, the connecting rod being securely connected to the apparatus and being extended upwardly therefrom or at right angles to the longitudinal axis of the apparatus so that any irregularity in the rod may be corrected.

Figure 3 is a side elevation of the apparatus in use.

Figure 4 is an end elevation of the same.

Figure 5 is a plan view of the apparatus, the piston contact block being shown in use.

Figure 6 is a side elevation of the apparatus in use, the piston contact block being shown in engagement with the piston.

Figure 7 is an end elevation illustrating the means for slidably connecting the piston contact member with the base.

In the drawing wherein for the purpose of illustration is shown a preferred embodiment of the invention, the numeral 10 designates an elongated sheet of metal having one end portion provided with upstanding sides 11 arranged in spaced parallel relation and having V-shaped notches 12 for the reception of a mandrel 13.

In carrying out the invention a number of mandrels 13 are provided and a mandrel of a size to snugly fit within the bearing 14 of the connecting rod 15 is employed. That is to say one mandrel is provided for each size bearing.

In use a mandrel 13 is inserted through the bearing 14 and the fastening devices 16 of the connecting rod bearing 14 are tightened so that there will be no play or uncontrolled movement between the rod and the mandrel.

The wrist pin 18 of the connecting rod is now engaged with the parallel contact faces 20 of a carriage 21 and if both ends of the wrist pin flatly contact with the horizontal faces the connecting rod is not twisted. However in case one end of the wrist pin 18 will not flatly contact with the adjacent horizontal face 20 the connecting rod is twisted.

The carriage is slidable longitudinally of the elongated base 10 and is as illustrated in Figure 4 provided with a groove 24 for the reception of a longitudinally extending guide rib 25. The guide rib 25 is snugly received in the longitudinal groove 24 and therefore guides the carriage and holds the same against lateral movement.

Each side of the U-shaped carriage 21 is provided intermediate its vertical ends with an extension 30 the edges of which are engaged by the side of the wrist pin 18. When the connecting rod is moved to the position illustrated in Figure 3 the wrist pin will flatly contact with a pair of extensions 30 unless the rod is bent. In this case the ends of the wrist pin 18 will not flatly contact with the vertical extensions 30 and this will positively indicate to the operator that the rod is bent.

The improved rod may be straightened or made true without detaching the same from the machine or apparatus so that frequent tests may be made. To this end I have provided the upstanding sides 11 with bolts 34 on opposite sides of the V-shaped notches 12 and two of these bolts have connection with holding arms 35. The remaining two of the bolts 34 are received in slots 36 in the ends of the arms. When the arms 35 are connected to all the bolts 34 as illustrated in Figure 2 the nuts 38 may be tightened so as to securely hold the mandrel 13 in position. The connecting rod is positioned at right angles to the longitudinal axis of the base 10 and is bent in any desired manner so as to remove the bend or irregularity in the rod.

When it is desired to test the rod the same is swung downwardly to contact with the horizontal faces 20 and the vertical edges 45 of the extensions 30. In this manner it is possible to make frequent tests of the connecting rod without removing the same from the apparatus. Attention is directed to the fact that the force exerted on the rod 16 when the same is again straightened is not in any way transmitted to the carriage 21 and consequently the carriage cannot be distorted.

The connection between the piston 60 and the rod 15 may be tested by a carriage 61 having a testing block 62 provided with an attaching base 63 slidable transversely of the longitudinal axis of the base. Figure 7 plainly illustrates that the upper side of the carriage 61 is provided with a rib or tongue 65 which is received in a groove extending lengthwise of the base 63. In this manner it is possible to adjust the piston contact plate 62 for use in connection with pistons of various diameters.

Figure 7 illustrates that the carriage 61 extends for a substantial distance beyond one side of the base 10 and slidably supports the piston testing block or plate so that the same may be flatly engaged with the piston.

In the use of this form of the invention the carriage 61 is turned to the proper position on the base 10 and the block 63 is now positioned so that the piston contact plate 62 will contact with the piston. This permits the connection between the piston and the piston rod to be tested. Attention is also directed to the fact that the piston flatly rests uopn the top of the carriage 61 when the piston contact plate 62 is moved into engagement with the piston. In this manner an accurate test may be made.

With reference to the foregoing description taken in connection with the accompanying drawing it will be seen that a combined connecting rod straightening and testing device constructed in accordance with this invention may be economically manufactured owing to the few parts employed and in use the rod is extremely simple to use and durable. Of course the base 10 may be securely connected to a bench or other suitable support by means of fastening devices which may be extended through openings 70 in the corners of the base.

Having thus described the invention, what is claimed is:—

1. An apparatus for testing and straightening piston rods comprising an elongated base having upstanding sides provided with notches, a mandrel received in said notches and adapted for connection with a piston rod, a carriage slidable upon said base and extended for a substantial distance beyond one longitudinal edge of the same, a piston contact block slidably mounted on said carriage and movable transversely of the longitudinal axis of the base and provided with an upstanding piston contact plate, there being a tongue and groove connection between the carriage and the base and between the piston contact block and the carriage.

2. An apparatus for testing and straightening piston rods comprising an elongated base having upstanding sides provided with notches, a mandrel received in said notches and adapted for connection with a piston rod, a carriage slidable upon said base and extended for a substantial distance beyond one longitudinal edge of the same, a piston contact block slidably mounted on said carriage and movable transversely of the longitudinal axis of the base and provided with an upstanding piston contact plate.

JOHN C. TAYLOR.